(12) United States Patent
Bernard et al.

(10) Patent No.: US 7,168,331 B1
(45) Date of Patent: Jan. 30, 2007

(54) CABLE TIE HAND TOOL TESTING APPARATUS

(75) Inventors: William A. Bernard, Darien, IL (US); Brian K. Arflack, Burr Ridge, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 11/236,481

(22) Filed: Sep. 27, 2005

Related U.S. Application Data

(60) Provisional application No. 60/613,498, filed on Sep. 27, 2004, provisional application No. 60/694,590, filed on Jun. 28, 2005.

(51) Int. Cl.
*G01L 1/00* (2006.01)
(52) U.S. Cl. .................................. 73/862.541
(58) Field of Classification Search ........... 73/862.541, 73/832
See application file for complete search history.

(56) References Cited

U.S. PATENT DOCUMENTS

| 3,864,953 | A | 2/1975 | Fletcher et al. |
| 5,461,929 | A | 10/1995 | Jordan |
| 6,302,157 | B1 | 10/2001 | Deschenes et al. |
| 6,481,467 | B2 | 11/2002 | Czebatul et al. |
| 6,615,879 | B2 | 9/2003 | Kurmis |

*Primary Examiner*—Robert Raevis
(74) *Attorney, Agent, or Firm*—Robert A. McCann; Christopher S. Clancy

(57) ABSTRACT

An apparatus for testing the tension settings of cable tie hand tools comprises a base, a gauge, a force transmitting member connected to the gauge and a cable tie hand tool receiving member positioned on the base. In one embodiment, the force transmitting member comprises a spring and a first hinged arm. In a second embodiment, the force transmitting member comprises a strap section of a cable tie. The cable tie receiving member is adapted to receive and position the cable tie hand tool. The apparatus may be employed with various types of cable tie hand tools.

15 Claims, 9 Drawing Sheets

CABLE TIE HAND TOOL TESTING APPARATUS

CROSS-REFERENCE TO RELATED APPLICATIONS

This application claims priority to U.S. Provisional Application Ser. Nos. 60/613,498, filed Sep. 27, 2004, and 60/694,590, filed Jun. 28, 2005.

FIELD OF INVENTION

This invention relates to an apparatus used with cable tie hand tools and, more particularly, to an apparatus for testing the tension settings of cable tie hand tools.

BACKGROUND

The use of cable tie hand tools for applying cable ties to bundles of wires or cables is common. The tension setting of the cable tie hand tool is an important aspect of this process, as it typically determines the tightness with which a cable tie is applied. If the setting is too high, the cable tie may cut into the cable bundle or break. If the setting is too low, the cable tie may not adequately hold the cables and shift over time.

It would, therefore, be desirable to provide a testing device having the ability to ascertain whether cable tie hand tools are being operated at a range of proper tension settings in the field.

SUMMARY OF THE INVENTION

The present invention relates to an improved apparatus and method for testing the tension settings of cable tie hand tools. Briefly, the apparatus of the present invention comprises a base, a gauge, a force transmitting member connected to the gauge and a cable tie hand tool receiving member positioned on the base. The cable tie receiving member is adapted to receive and position the cable tie hand tool. As used herein, the term base means any structure to which the cable tie hand tool receiving member is connected. The term force transmitting member means any structure or component capable of carrying or transmitting force from the cable tie hand tool to the gauge.

In one embodiment, the apparatus of the present invention comprises a base, a gauge, a force transmission member connected to the gauge, a cable tie receiving assembly around which a cable tie may be tightened, a cable tie hand tool receiving member for receiving and positioning the cable tie hand tool. The cable tie hand tool receiving member of this embodiment comprises a bracket and is positioned on the base. The apparatus may further comprise first and second hinged arms and an engagement member, such as a hook. The term engagement member as used herein means any structure or component that connects the gauge to the force transmitting member. The force transmitting member may comprise a combination of a spring and the first hinged arm. The first hinged arm may extend substantially equal distances on either side of the hinge. The cable tie receiving assembly may comprise first and second projections separated by a distance of about 0.5 inches to about 1.0 inch. The first projection may be fixed on a vertical support member and the second projection movable relative thereto or vice versa. Under this construction, movement of the second hinged arm can exert a force on the second projection to move it closer to the first projection.

In a second embodiment, the apparatus of the present invention comprises a gauge, an engagement member connected to the gauge, a force transmitting member comprising a first portion and a second portion, with the first portion connected to the engagement member and the second portion connected to a cable tie hand tool. The first portion of the force transmitting member may advantageously be positioned in alignment with the engagement member. The apparatus may further comprise a cable tie hand tool receiving member, a clamp and an actuator for automatically actuating the cable tie hand tool. The force transmitting member may comprise a strap section of a cable tie. The engagement member may comprise a gauge gripper for receiving and holding the strap section of the cable tie. The aforementioned cable tie hand tool receiving member may comprise a cavity associated with the base, and the cable tie hand tool may be secured to the cavity with the clamp. The actuator is adapted to automatically actuate the cable tie hand tool by applying an operating force to the cable tie hand tool. The actuator is capable of automatic retraction.

BRIEF DESCRIPTION OF DRAWINGS

Certain embodiments of the present invention are illustrated by the accompanying figures. It should be understood that the figures are not necessarily to scale and that details not necessary for an understanding of the invention or that render other details difficult to perceive may be omitted. It should be understood, of course, that the invention is not necessarily limited to the particular embodiments illustrated herein.

DETAILED DESCRIPTION

The apparatus of the present invention is adapted to test the tightness with which cable tie hand tools apply cable ties around bundles of cable. The apparatus may be employed with various types of cable tie hand tools, including both manual and automatic cable tie hand tools. Such tools are typically capable of deploying cable ties of varying lengths, including miniature ties (about 4.0 inches in length), intermediate ties (about 6.0 inches in length) and standard ties (about 8.0 inches in length).

Figure 1:
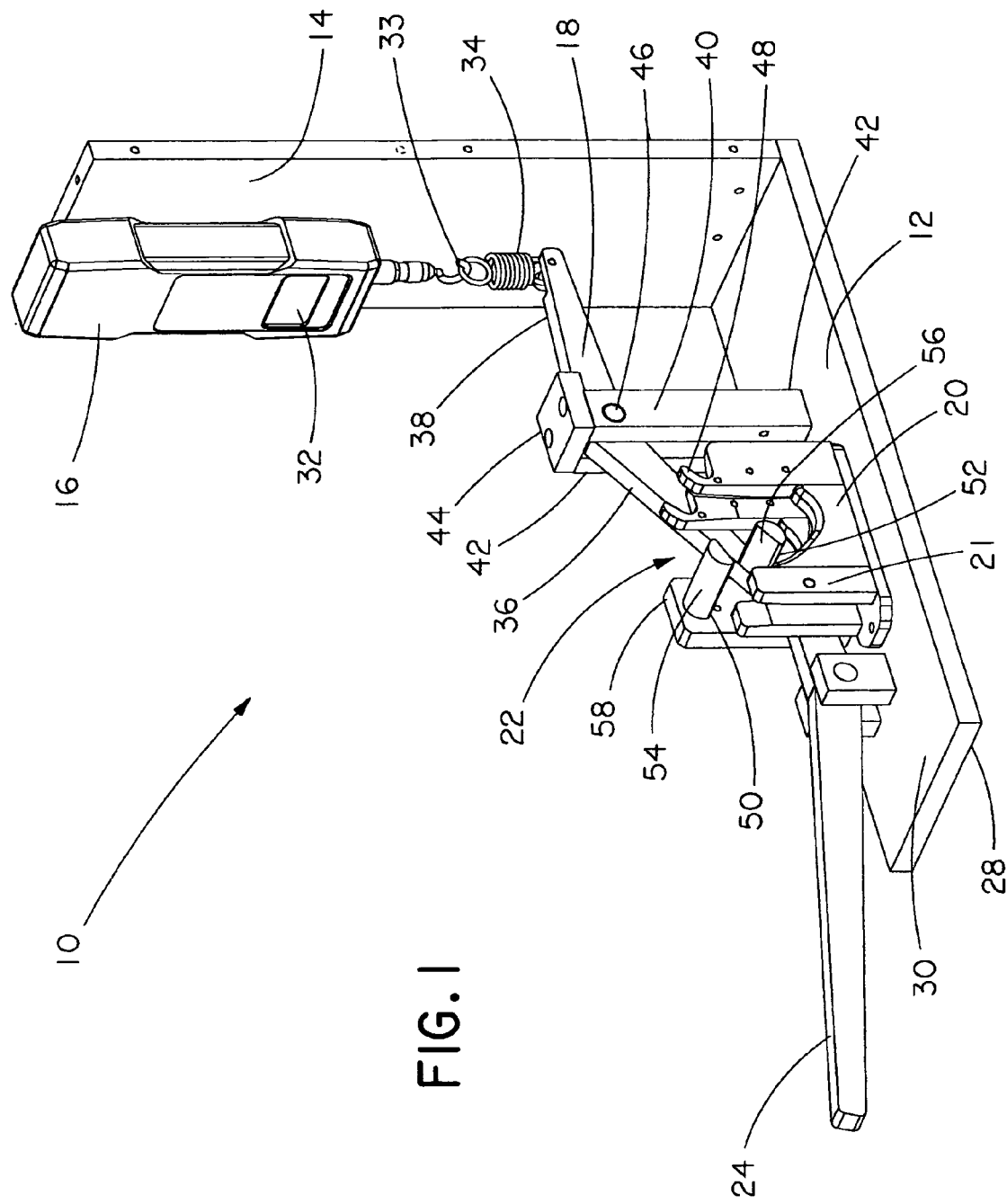
FIG. 1 is a perspective view of a first embodiment of the apparatus of the present invention, in the absence of a cable tie hand tool.
Figure 2:
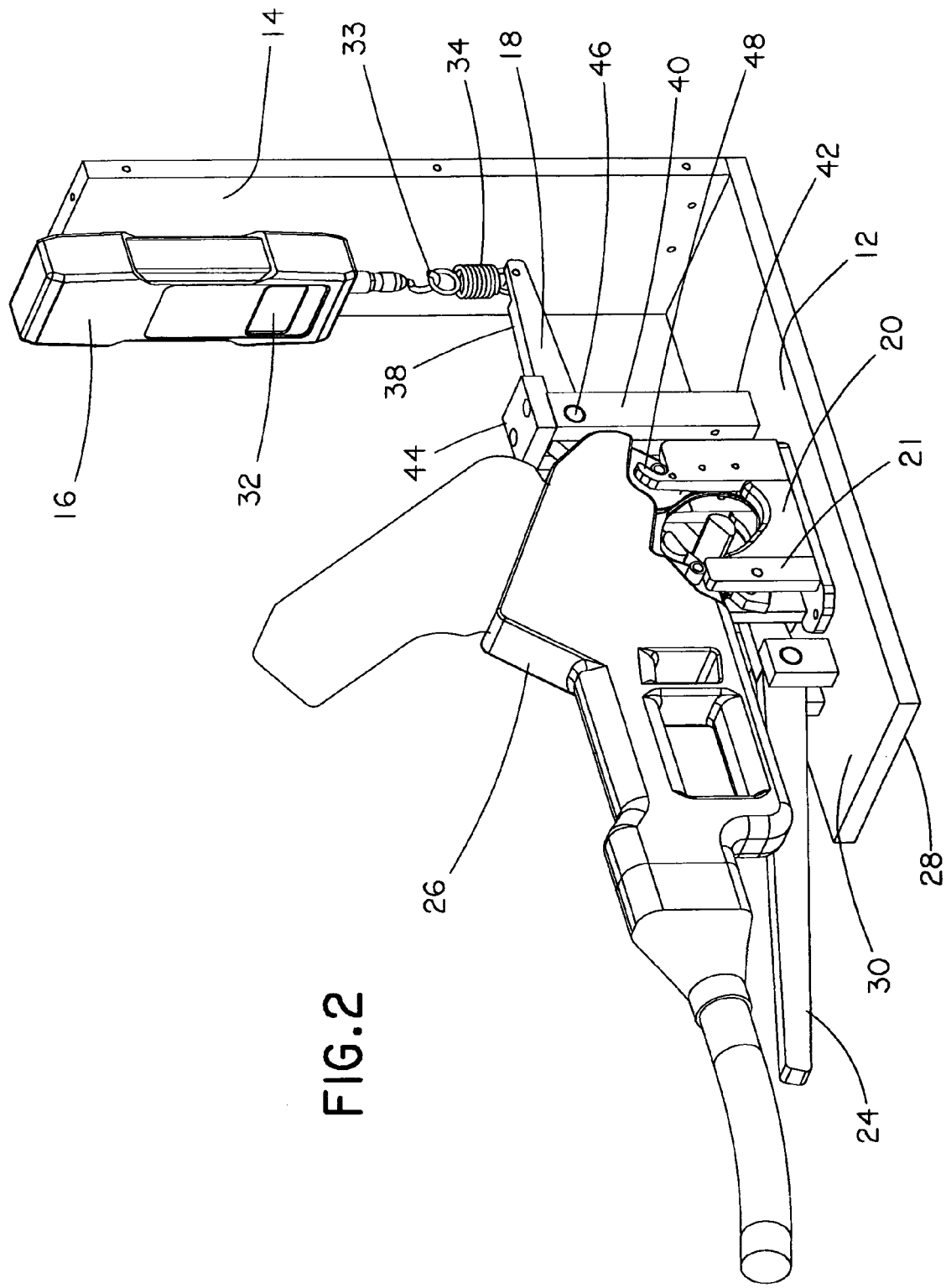
FIG. 2 is a perspective view of the apparatus of FIG. 1, with a cable tie hand tool installed for testing.

Referring now to FIGS. 1 and 2, one embodiment of the apparatus 10 of the present invention is shown. As shown in FIG. 1, apparatus 10 comprises base 12, vertical support member 14, force gauge 16, first hinged arm 18, cable tie hand tool receiving member 20, cable tie receiving assembly 22 and second hinged arm 24. As shown in FIG. 2, cable tie hand tool 26 may be positioned on cable tie hand tool receiving member 20.

Base 12 is typically a flat platform comprising bottom portion 28 and top portion 30. Bottom portion 28 may be positioned on a flat surface. Top portion 30 is connected to vertical support member 14, which is adapted to carry force gauge 16.

Force gauge 16 may be affixed to vertical support member 14 by various means known to those of skill in the art, such as adhesives. Force gauge 16, which may include digital readout 32, measures the maximum tension and residual tension applied by cable tie hand tool 26. One suitable force gauge 16 is available from Imada, Inc. of Northbrook, Ill. Engagement member 33 may connect force gauge 16 to spring member 34, which, in turn, is connected to first hinged arm 18. Engagement member 33 may take the form of a hook. Spring member 34 may be about 1.0 inch to about 3.0 inches in length and exhibit a spring rate between about 50.0 lbs./inch and about 120 lbs./inch and, more particularly, between about 75 lbs./inch and about 100.0 lbs./inch. In this embodiment and as shown in FIGS. 1 and 2, spring 34 and first hinged arm 18 are together considered the force transmitting member.

First hinged arm 18, alternatively referred to as rocker arm, includes front portion 36 and rear portion 38, which are typically equal in length. With front and rear portions 36 and 38 of equal length, equal force can be applied to both ends of first hinged arm 18 to provide more accurate readings on force gauge 16. The aforementioned spring rate should be high enough to prevent second projection 52 which is attached to rocker arm 18 from bottoming out on fixed first projection 50. A central portion of rocker arm 18 may be positioned within housing 40, which comprises opposing sidewalls 42 and top 44. Pin 46 is positioned through opposing sidewalls 42 and central portion of first hinged arm 18 to create a hinged connection, such that front and rear portions 36 and 38 move in opposite directions upon application of force to one end of first hinged arm 18.

Cable tie hand tool receiving member 20, which may comprise bracket 21, is positioned on base 12 and is adapted to receive cable tie hand tool 26. A top portion of cable tie hand tool receiving member 20 may include J-shaped projections 48 for locating cable tie hand tool 26 in an exact location. J-shaped projections 48 can, however, be eliminated depending on the particular cable tie hand tool 26 undergoing testing.

Cable tie receiving assembly 22 may include opposing first and second projections 50 and 52, each including rounded top side 54 and opposing flat side 56, wherein flat sides 56 of first and second projections 50 and 52 typically face one another. First opposing projection 50 may be connected and positioned transverse to vertical support member 58 and is typically fixed in position. Second opposing projection 52 is positioned at an end of front portion 36 of first hinged arm 18 and is typically movable relative to first opposing projection 50. Other configurations of cable tie receiving assembly 22 are, however, suitable. For example, the location of vertical support member 58 and cable tie hand tool receiving member 20 may be reversed, such that first opposing projection 50 is positioned on an opposite side of the apparatus. At rest, first and second opposing projections 50 and 52 are typically separated by a distance of about 0.5 inches to about 1.0 inch. This configuration advantageously provides more accurate residual tension readings relative to certain known testing devices.

Figure 3:
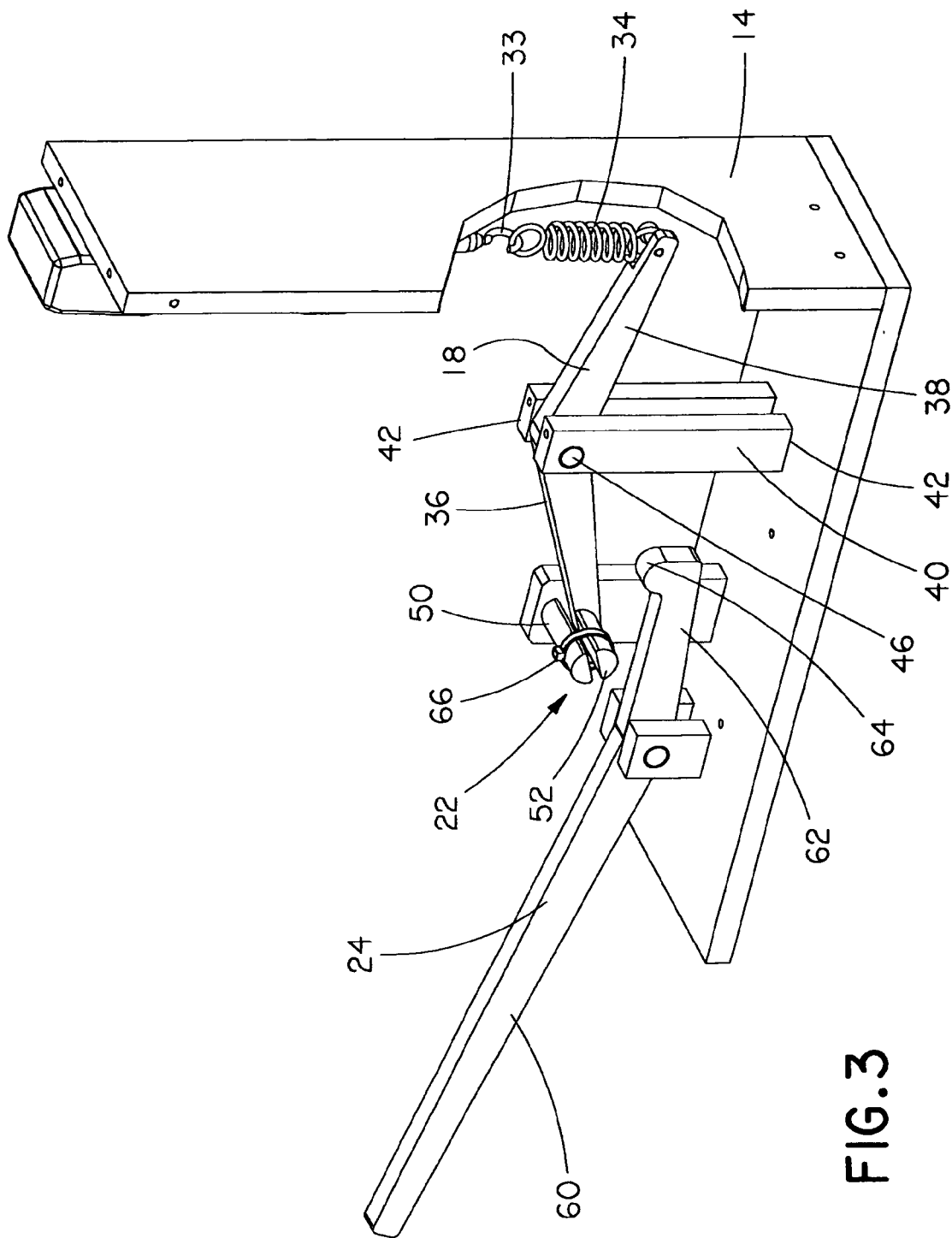
FIG. 3 is a partially broken away perspective view of the apparatus of FIG. 1, with the cable tie hand tool receiving member removed and showing the relationship between the first hinged arm and the second hinged arm with a cable tie secured around the cable receiving assembly.

Second hinged arm 24, alternatively referred to as release arm, is shown in FIG. 3. Second hinged arm 24 is hinged about a common pivot axis and comprises first and second portions 60 and 62. Second portion 62 comprises rounded projection 64 for contacting front portion 36 of rocker arm 18. With downward force applied to first portion 60, rounded projection 64 contacts front portion 36 of rocker arm 18, moving second projection 52 of cable tie receiving assembly 22 closer to first projection 50, thereby releasing tension on cable tie 66 for ready removal.

Apparatus 10 may be constructed of aluminum, stainless steel or other suitable material. Apparatus 10 is typically machined, followed by installation of force gauge 16 and spring member 34.

In operation, apparatus 10 is utilized to test the tension of various types of cable tie hand tools. A step-wise process is employed, though the order of the process may vary.

Apparatus 10 is placed on a flat surface, such as a bench or countertop. Apparatus 10 begins at rest, with first and second projections 50 and 52 of cable tie receiving assembly 22 in a spaced-apart relationship and spring member 34 in a relaxed state, as shown in FIG. 1.

Force gauge 16 is typically powered on and a tension readout of 0.0 appears. If force gauge 16 does not display 0.0, force gauge 16 should be reset. Thereafter, peak mode is activated to record the peak tension exerted by use of cable tie hand tool 26.

A user loads cable ties 66 into cable tie hand tool 26 and sets cable tie hand tool 26 to a proper setting. The user may next install cable tie hand tool 26 on cable tie receiving member 20 and deploy cable tie 66 around opposing first and second projections 50 and 52 of cable tie receiving assembly 22, as shown in FIG. 2. At this point, opposing first and second projections 50 and 52 of cable tie receiving assembly 22 remain in a spaced apart relationship and spring member 34 is still in a relaxed state.

Figure 4:
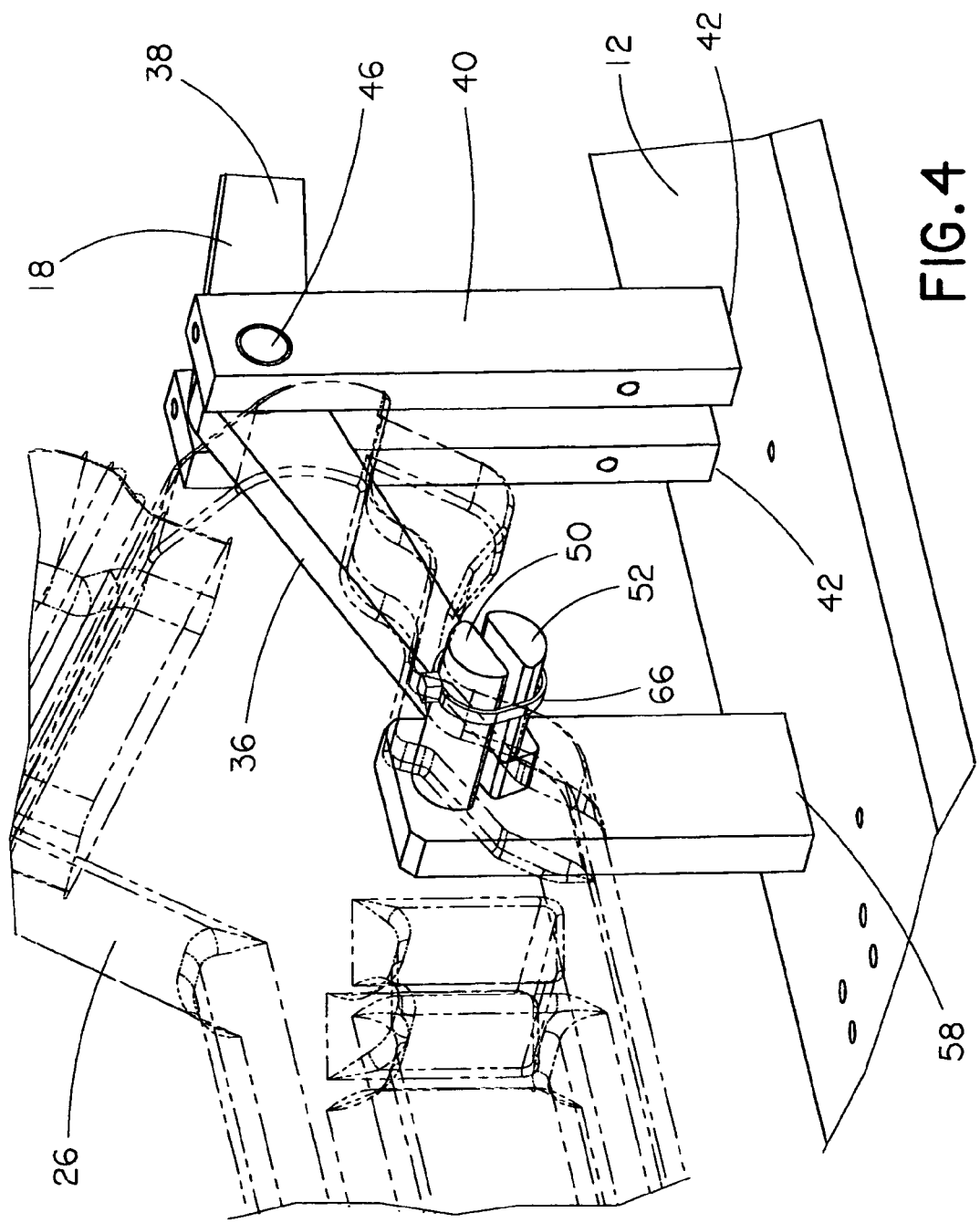
FIG. 4 is a partially enlarged view of the first and second projections of the cable tie receiving assembly of the apparatus shown in FIG. 3, with a cable tie hand tool in phantom.
Figure 5:
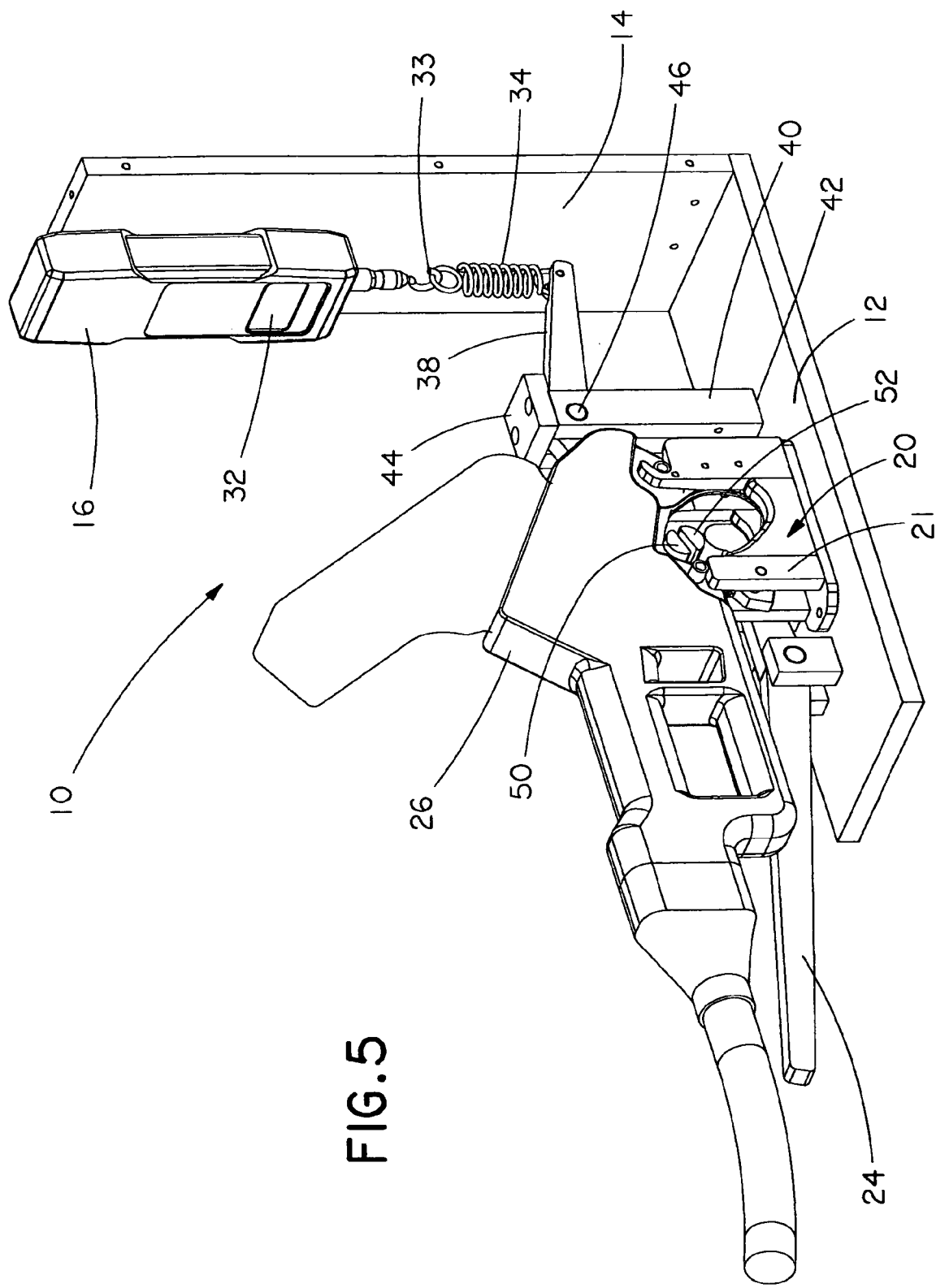
FIG. 5 is a perspective view of the apparatus of FIG. 2, after activation of the cable tie hand tool.

Cable tie hand tool 26 is then manually or automatically activated to contract cable tie 66 and urge first and second projections of 50 and 52 of cable tie receiving assembly 22 closer together, as seen in FIGS. 4 and 5. In turn, front portion 36 of first hinged arm 18 moves upward while rear portion 38 moves downward, exerting downward force on and stretching spring member 34. This state of apparatus 10 is shown in FIG. 5.

Force gauge 16 displays a peak tension readout, based on the contraction of cable tie 66 around first and second projections 50 and 52 of cable tie receiving assembly 22. The peak tension readout corresponds to how tightly cable tie hand tool 26 will apply cable tie 66.

The operation may then be repeated with the same or different cable tie hand tools 26 and/or the tension settings of cable tie hand tool 26 may be adjusted. To repeat the operation, cable tie 66 is removed and force gauge 16 is reset to 0.0. To remove cable tie 66, second hinged arm 24 is moved downward, which exerts upward force on front portion 36 of first hinged arm 18, thereby moving first and second projections of 50 and 52 even closer together. Positioning first and second projections 50 and 52 closer together permits a user to more readily slide cable tie 66 off a single side of cable tie receiving assembly 22 to begin a new cycle. Additionally or alternatively, the tension setting of cable tie hand tool 26 may be adjusted based on the peak tension readout displayed by force gauge 16.

FIGS. 6–9 illustrate a second embodiment of the cable tie hand tool testing apparatus 100 of the present invention. Apparatus 100 includes base 101, cable tie hand tool receiving member or cavity 102, cable tie hand tool 104, force transmitting member 106, digital force gauge 108 and actuator 120. Cavity 102 may contain a urethane insert (not shown) for receiving hand tool and a retaining clamp 124 for securing hand tool 104 within cavity 102. Digital force gauge 108 may be coupled to engagement member 126, which receives and holds a portion of force transmitting member 106—in this case a strap section of a cable tie.

Figure 6:
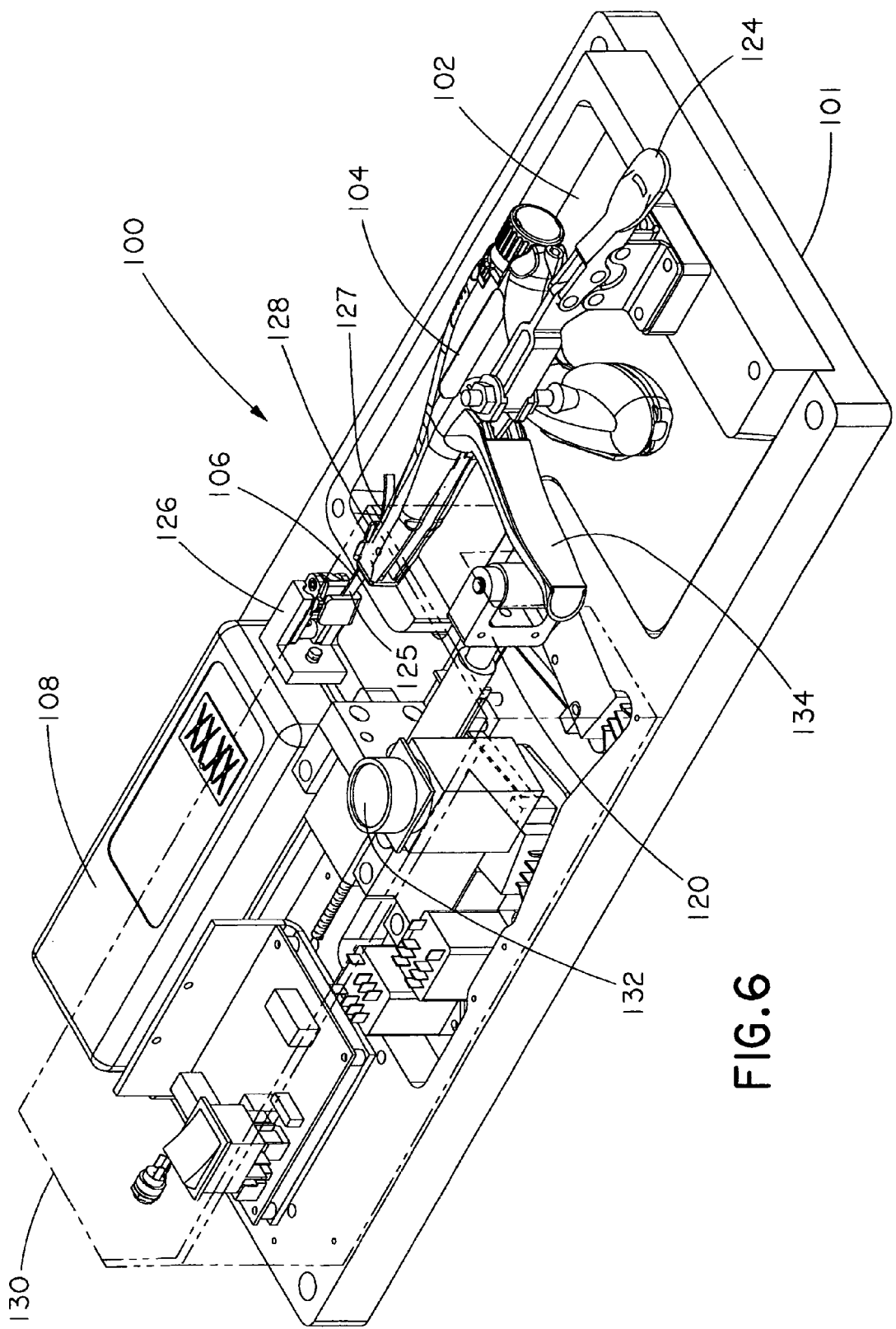
FIG. 6 is a perspective view of a second embodiment of the apparatus of the present invention.
Figure 9:
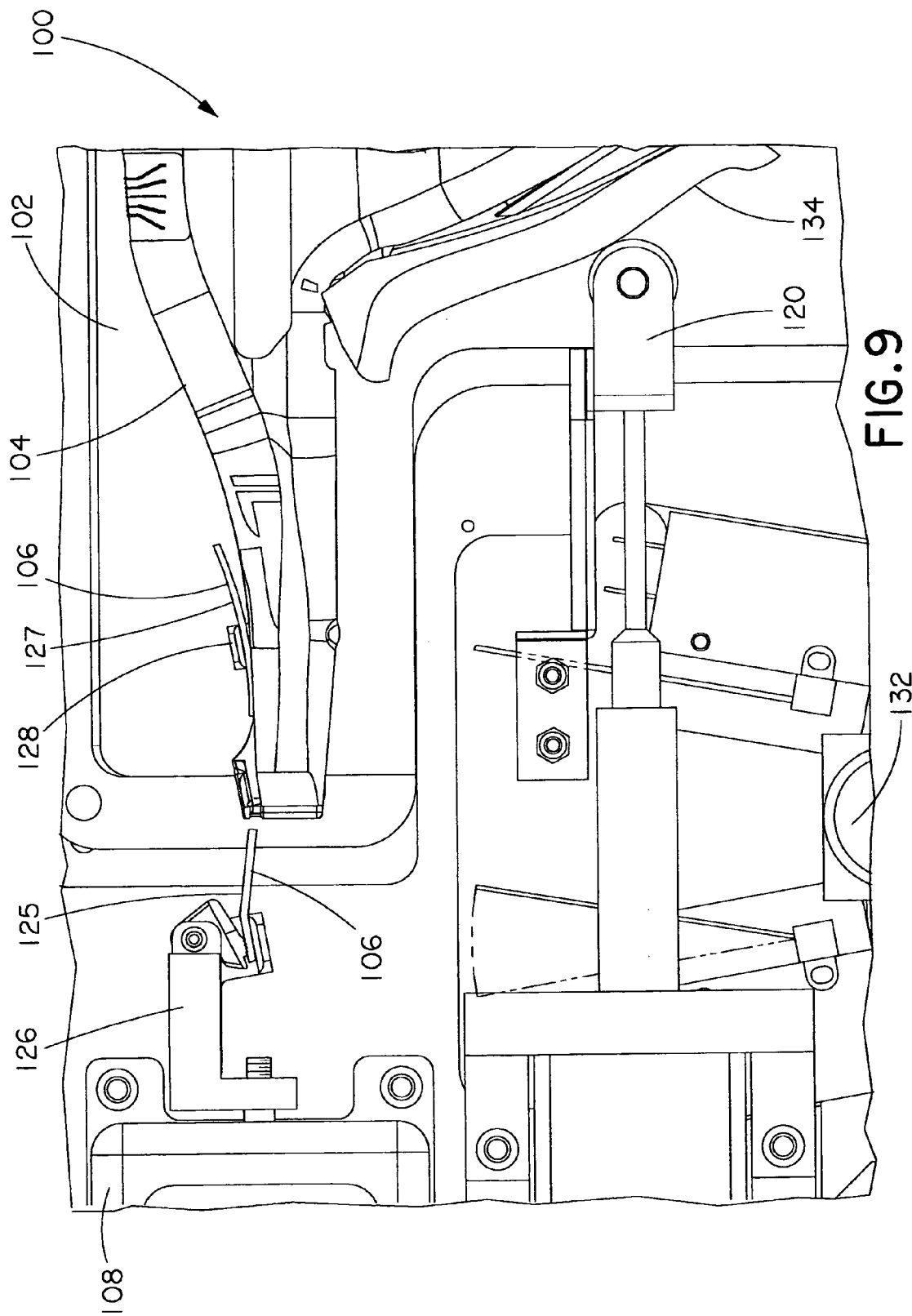
FIG. 9 is a partial top view of the apparatus of FIG. 6, showing a strap section of a cable tie after it has been cut.

Engagement member 126 aligns with hand tool gripper 128 and digital force gauge 108. The engagement member 126 shown in FIG. 6 is a gauge gripper. Force transmitting member 106 may comprise first and second portions 125 and 127, with first portion 125 connected to engagement member 126 and second portion 127 connected to cable tie hand tool 104, as best seen in FIG. 9. In this embodiment, first portion 125 is positioned in alignment with engagement member 126.

Figure 8:
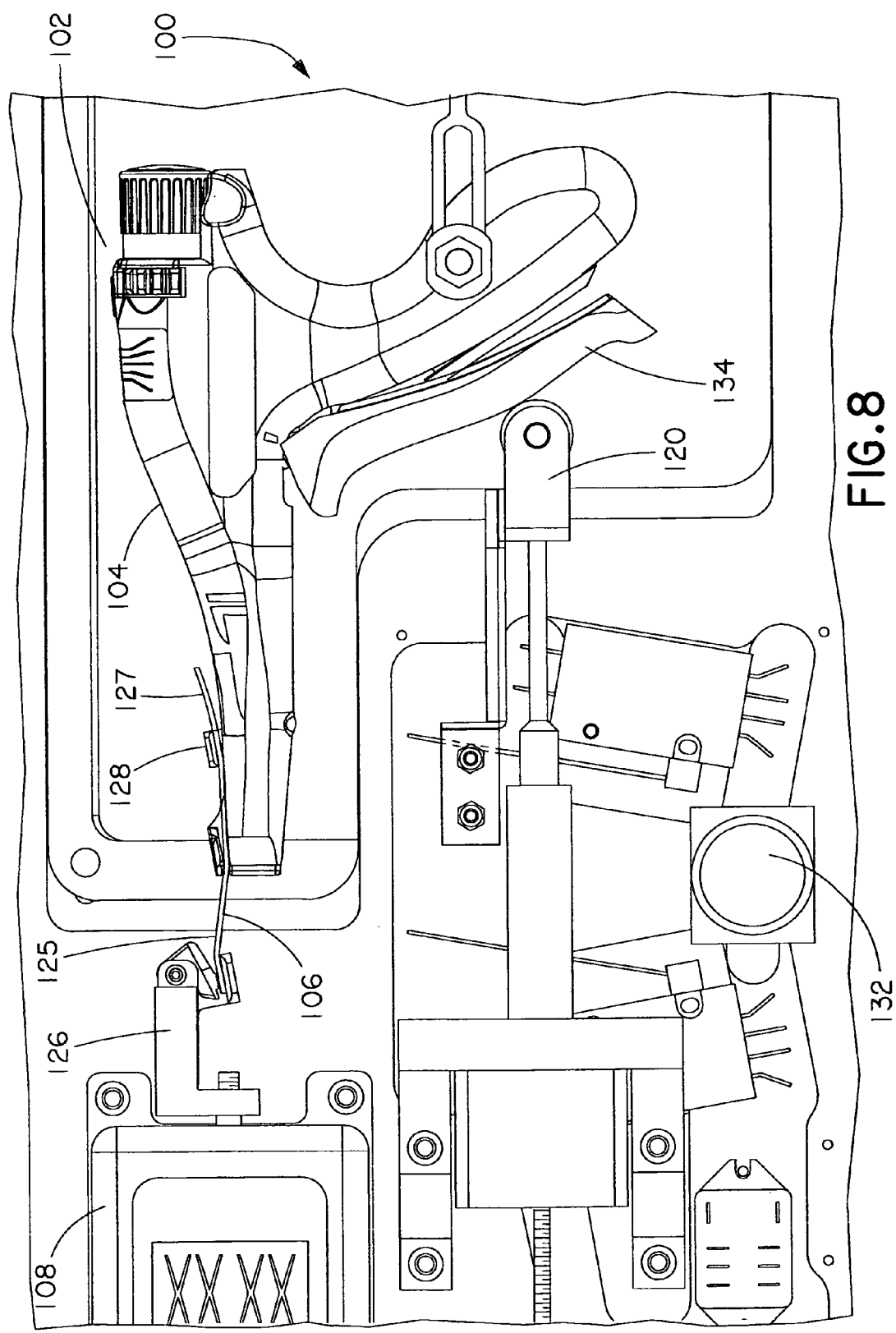
FIG. 8 is a partial top view of the apparatus of FIG. 6, showing the actuator in an extended state.

Enclosure 130, shown in phantom in FIG. 6, surrounds actuator 120 to restrict inadvertent access to actuator 120. Actuator 120 automatically actuates cable tie hand tool 104 and can control its handle speed to maintain data collection within the predefined range of digital force gauge 108. A start/stop push-button 132 initiates extension of actuator 120, which applies an operating force at a controlled velocity to handle 134 of hand tool 104, as best seen in FIG. 8. After extension of actuator 120 is initiated, actuator 120 extends through a predetermined distance of travel, as shown in FIG. 8. Within the predetermined distance of travel, hand tool 104 completes a cut-off cycle (see FIG. 9).

Figure 7:
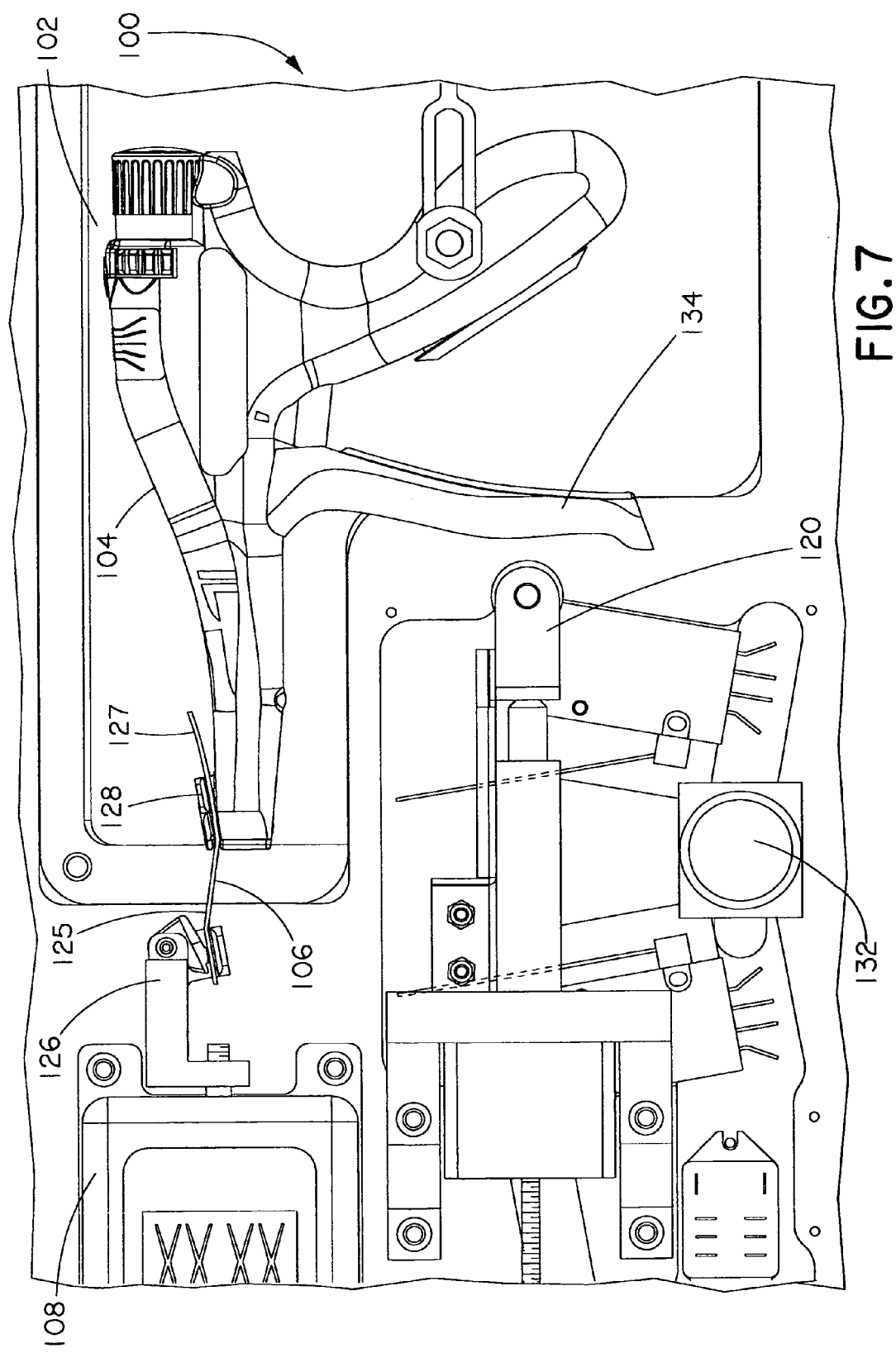
FIG. 7 is a partial top plan view of the apparatus of FIG. 6, showing an actuator in a retracted state.

During actuator 120 extension, digital force gauge 108 measures the maximum tension applied by cable tie hand tool 104. After the predetermined distance of travel is reached, actuator 120 will automatically retract from its extended position, and the operating force applied to handle 134 of hand tool 104 is removed. After retraction is initiated, actuator 120 retracts through the predetermined distance of travel until it reaches its original starting location before extension was initiated, as best seen in FIG. 7.

Apparatus 100 may be readily made and assembled, as shown in FIGS. 6–9. Base 101, the plate surrounding cavity 102 and enclosure 130, may be constructed of aluminum, stainless steel or other suitable material. These components are typically machined or stamped. Other components, such as actuator 120 and digital force gauge 108, may be purchased. Actuator 120 is powered by an electric motor and may comprise a linear motion actuator mechanism. Actuator 120 is typically configured to automatically retract. Start/stop button 132 is electrically connected to actuator and begins a testing cycle.

In operation, the first step is to power-on apparatus 100. A user turns on digital force gauge 108. After digital force gauge 108 is turned on, it should display 0.0.

The second step is to install hand tool 104. The user installs a urethane insert (not shown) into cavity 102, and hand tool 104 is placed in the insert. Each tool type requires a specific urethane insert to properly contain hand tool 104 in apparatus 100. Retaining clamp 124 is then fully depressed to properly restrain hand tool 104 during operation.

The third step is to install force transmitting member (i.e., strap section of cable tie) 106 and set hand tool 104 to a proper setting. The user should locate a properly sized strap section of cable tie 106 for use with each particular tool type and each particular tool setting. The user places strap section of cable tie 106 into the cable tie hand tool gripper 128 and into engagement member 126. It is advisable to cut the tail of strap section of cable tie 106 to avoid stretching and improper cutoff.

The fourth step is the operation cycle. Digital force gauge 108 may indicate a non 0.0 value after inserting strap section of cable tie 106. Thus, the memory should be cleared before each tension cycle. The peak mode on digital force gauge 108 is activated to record the peak tension of hand tool 104 at cutoff of strap section of cable tie 106. The user pushes start-stop button 132 to operate hand tool 104, which cuts strap section of cable tie 106 and retracts hand tool 104 to the starting state of the cycle. A peak tension value is displayed on digital force gauge 108, which represents the maximum tension applied at the cable tie cut-off.

The fifth step is to reset the cycle. The user removes the cut-off cable tie tail, and either removes strap section of cable tie 106 from hand tool 104 or feeds the remaining portion of strap section of cable tie 106 into engagement member 126 for the next test operation with the same tool. The cut-off cable tie tail should be removed before another operation can begin. Digital force gauge 108 on apparatus 100 is reset to a 0.0 reading before another test cycle begins; otherwise inaccurate results may be displayed.

The sixth step is to adjust hand tool 104 and repeat the test cycle, or remove hand tool 104. The user can perform another test on the same hand tool 104 by adjusting the hand tool tension setting knob and returning to the cable tie installation step (step 3). The user may perform a tension test on another tool type by returning to the tool installation step (step 2) and inserting a new tool. The user may end the testing by turning off digital force gauge 108 and apparatus 100.

The disclosed invention provides a hand tool testing device having the ability to verify the tension setting or calibration of cable tie hand tools in the field. It should be noted that the above-described and illustrated embodiments and preferred embodiments of the invention are not an exhaustive list of the forms such a testing device in accordance with the invention might take; rather, they serve as exemplary and illustrative of embodiments of the invention as presently understood. Many other forms of the invention are believed to exist. The actual scope of the invention, therefore, is defined in the following claims.

The invention claimed is:

1. An apparatus for testing the tension setting of a cable tie hand tool, the apparatus comprising:
   a base and a support member connected to the base:
   a gauge connected to the support member:
   a force transmitting member connected to the gauge: and
   a cable tie hand tool receiving member positioned on the base, the cable tie hand tool receiving member for receiving and positioning a cable tie hand tool.

2. The apparatus of claim 1, wherein the gauge includes an engagement member connected to the gauge, the engagement member including a hook.

3. The apparatus of claim 1, wherein the force transmitting member comprises a spring and a rocker arm connected to the spring.

4. The apparatus of claim 3, wherein the rocker arm includes a front portion and a rear portion connected to the front portion, the front and rear portions extending substantially equal distances on either side of a hinge.

5. The apparatus of claim 1, further comprising a cable tie receiving assembly connected to the base, the cable tie receiving assembly including a vertical support member connected to the base and a rocker arm connected to the base.

6. The apparatus of claim 5, wherein the vertical support member includes a first projection and the rocker arm includes a second projection, the first and second projections separated by a distance of about 0.5 inches to about 1.0 inch.

7. The apparatus of claim 6, wherein the second projection is movable relative to the first projection.

8. The apparatus of claim 7, wherein movement of a release arm exerts a force on the second projection.

9. The apparatus of claim 1, further comprising an engagement member including a gauge gripper coupled to the gauge, the gauge gripper for receiving and holding a strap section of a cable tie connected to the engagement member.

10. The apparatus of claim 1, wherein the force transmitting member comprises a strap section of a cable tie.

11. The apparatus of claim 1, wherein the cable tie hand tool receiving member includes a cavity associated with the base.

12. The apparatus of claim 11, further comprising a clamp for securing the cable tie hand tool within the cavity.

13. The apparatus of claim 1, further comprising an actuator connected to the cable tie hand tool receiving member, the actuator for automatically actuating the cable tie hand tool.

14. The apparatus of claim 13, wherein the actuator applies an operating force to actuate the cable tie hand tool.

15. The apparatus of claim 13, wherein the actuator automatically retracts.

* * * * *